United States Patent [19]
Houben

[11] 3,925,089
[45] Dec. 9, 1975

[54] METHOD OF MANUFACTURING A MIXTURE FOR TV GLASSES
[75] Inventor: Mathijs Maria Hendrikus Houben, Eindohoven, Netherlands
[73] Assignee: U.S. Philips Corporation, New York, N.Y.
[22] Filed: Sept. 24, 1973
[21] Appl. No.: 400,402

[30] Foreign Application Priority Data
Oct. 5, 1972  Netherlands............... 7213465

[52] U.S. Cl. .................. 106/53; 106/52; 106/54
[51] Int. Cl.² .......................................... C03C 3/04
[58] Field of Search ......... 106/52, DIG. 8, 73.4, 54, 106/53, 73.5

[56] References Cited
UNITED STATES PATENTS

| | | | |
|---|---|---|---|
| 2,366,473 | 1/1945 | Bair | 106/52 |
| 3,001,881 | 9/1961 | Slayton | 106/DIG. 8 |
| 3,222,206 | 12/1965 | Cornelissen | 106/52 |
| 3,325,298 | 6/1967 | Brown | 106/52 |
| 3,794,502 | 2/1974 | La Grouw | 106/52 |

OTHER PUBLICATIONS
Ceramic Industry 1967 Handbook of Materials for Ceramic Processing, p. 92.
Ceramic Age – "Micron–sized Silica available in Production Lots" Sept. 1961, p. 34.

*Primary Examiner*—Patrick P. Garvin
*Assistant Examiner*—John F. Niebling
*Attorney, Agent, or Firm*—Frank R. Trifari; Daniel R. McGlynn

[57] ABSTRACT

The manufacture of a mixture for TV-glass whose composition lies within the following limits in % by weight:

| | | | |
|---|---|---|---|
| SiO | 50–75 | $Al_2O_3$ | 0.5–6 |
| PbO | 0–15 | CaO + MgO | < 5 |
| BaO | 0–15 Combined >8 | $R_2O$ | > 13 |
| ZrO | 0–8 | $B_2O_3$ | < 1 |
| SrO | 0–12 | | | with felspar having a specific surface > 1 sq. m/g and quartz sand having a specific surface < 0.1 sq. m/g.

1 Claim, No Drawings

METHOD OF MANUFACTURING A MIXTURE FOR TV GLASSES

The invention relates to a method of manufacturing a glass mixture consisting of felspar, quartz sand and other glass-forming components intended for the manufacture of TV glasses.

TV glasses are understood to mean those glasses for the screen or the cone of a cathode-ray tube for television image display which are located within the range of compositions limited as follows in % by weight:

| | | | |
|---|---|---|---|
| $SiO_2$ | 50–75 | $CaO + MgO < 5$ | |
| $Al_2O_3$ | 0.5–6 | $R_2O > 13 (Li_2O + K_2O + Na_2O)$ | |
| | | $B_2O_3 < 1$ | |
| PbO | 0–15 | | |
| BaO | 0–15 | $PbO + BaO + ZrO_2 + SrO > 8$ | |
| $ZrO_2$ | 0–8 | | |
| SrO | 0–12 | | |

The mixture which is used for the manufacture of this type of glass comprises felspar ($KAlSi_3O_8$ and/or $NaAlSi_3O_8$) as a source for $Al_2O_3$, quartz sand whose quantity is corrected for $SiO_2$ from the felspar as a source for $SiO_2$, alkali carbonates and/or optionally alkali hydroxides for the suppletion of the alkali oxide and for the remainder optionally minium, lead silicate, barium carbonate, zirconium oxide or zirconium sand, in the latter case, likewise as for lead silicate under correction of the quartz sand to be added, and calcium carbonate, magnesite or dolomite.

According to the invention it was found that an important acceleration of the melting process can be achieved as judged with respect to the freedom from bubbles in the glass melt and the dissolution of crystalline constituents if sodium powder and/or felspar powder is used in the glass mixture whose specific surface is larger than 1 sq. m/g in addition to quartz sand whose specific surface is less than 0.1 sq. m/g.

According to the invention it was found that in the mixture the felspar powder must satisfy the given requirement relating to a minimum specific surface thereof.

It was, however, also remarkable that the optimum effect of a shorter melting period was only achieved when the quartz sand also had a maximum specific surface.

The specifiic surface of fine and porous solid materials is determined in a simple manner by means of the area meter. The method on which the determination by means of this apparatus is based, namely adsorption of nitrogen at a low temperature was developed by Brunauer, Emmet and Teller and later simplified by R. Haul and G. Dumbgen (Chem. Ing. Techn. 32, 349–354 (1960) and 35, 586–589 (1963).

The principle of the measurement is as follows. An adsorption vessel containing the sample and a standard vessel of the same volume are filled at room temperature with nitrogen having an atmospheric pressure. Subsequently the two vessels are introduced into liquid nitrogen. The adsorption of nitrogen on the sample results in a pressure difference between the vessels. The quantity of adsorbed nitrogen can be calculated from this pressure difference and the filling pressure of the nitrogen and subsequently the specific surface can be calculated.

Decisive factors in making the glass melt are particularly the freedom from bubbles of the melt and, to a lesser extent, the disappearance of crystalline constituents.

The following scheme shows the effect of the invention giving assessment marks ranging from 1 (satisfactory) to 5 (poor).

| | mixture | | | assessment marks | |
|---|---|---|---|---|---|
| felspar (a) spec. surf. >1 sq.m/g | felspar (b) spec. surf. <1 sq m/g | quartz sand >0.1 sq.m/g | quartz sand <0.1 sq.m/g | disappearance of crystalline constituents | free from bubbles |
| | X | | X | 1 | 4 |
| | X | X | | 1 | 5 |
| X | | | X | 2 | 2 |
| X | | X | | 1 | 4 |

The invention will now be described with reference to some examples in which felspar (a) having a specific surface > 1 sq. m/g is compared with powder (b) having a specific surface < 1 sq. m/g and with quartz sand having a specific surface < 0.1 sq. m/g.

The following mixtures (in grammes) were composed.

| | 1 | 2 | 3 | 4 |
|---|---|---|---|---|
| quartz sand | 530 | 521 | 591 | 509 |
| felspar | 174.4 | 164 | 102 | 135 |
| sodium carbonate (anhydrous) | 141 | 131 | 124 | 134 |
| potassium carbonate | 70 | 108 | 80 | 135 |
| calcium carbonate | — | — | — | 36 |
| barium carbonate | 164 | 14.2 | 175 | 175 |
| minium | — | 123 | 34 | — |
| zirconium silicate | — | — | — | 45 |
| dolomite | 56.6 | 52.6 | — | — |
| antimony oxide | 6 | 5 | 7 | 6 |
| cerium oxide | 2.2 | | | 2 |
| iron powder | 0.5 | | | — |
| sodium nitrate | 15 | 10.2 | 5 | 15 |

A portion of 60 g of these mixtures was melted in air at 1430°C in a platinum crucible in an electric furnace under quick heating (within approximately 5 min. to 1430°C). The step according to the invention was found to reduce the time when the melt was free from bubbles from approximately 120 min. to 60 min. in all four cases.

The glasses obtained have the following composition in % by weight:

| | 1 | 2 | 3 | 4 |
|---|---|---|---|---|
| $SiO_2$ | 64.2 | 72.8 | 67.1 | 61.4 |
| $Na_2O$ | 9.2 | 8.6 | 7.5 | 8.8 |
| $K_2O$ | 6.6 | 9.1 | 6.1 | 7.8 |
| CaO | 1.8 | 1.6 | — | 2.0 |
| BaO | 12.8 | 1.1 | 13.6 | 13.6 |
| $ZrO_2$ | — | — | — | 3.0 |
| MgO | 1.2 | 1.2 | — | — |

-continued

|  | 1 | 2 | 3 | 4 |
|---|---|---|---|---|
| PbO | — | 12.0 | 3.3 | — |
| $Al_2O_3$ | 3.3 | 3.1 | 1.9 | 2.6 |
| $Sb_2O_3$ | 0.6 | 0.5 | 0.4 | 0.6 |
| $CeO_2$ | 0.2 |  |  | 0.2 |
| SrO | 0.1 |  | 0.1 |  |
| $Fe_2O_3$ | 0.1 |  |  |  |

What is claimed is:

1. A method of manufacturing a glass mixture intended for the manufacture of glasses for the screen of the cone of a cathode-ray tube for television image display, comprising the steps of:

provividing a mixture having the composition within the range limited as follows in % by weight:

$SiO_2$ 50–75  
$Al_2O_3$ 0.5–6  
PbO 0–15  
BaO 0–15  
ZrO 0–8  
SrO 0–12  
Combined > 8

CaO+MgO < 5  
$R_2O > 13$ ($Li_2O + Na_2O + K_2O$)  
$B_2O_3 < 1$ consisting of a pulverulent mixture of feldspar, quartz sand and other glass-forming components, wherein said feldspar has a specific surface larger than 1 sq. m/g and said quartz sand has a specific surface smaller than 0.1 sq. m/g and producing a glass melt from said mixture substantially free from bubbles and having enhanced dissolution of crystalline constituents.

\* \* \* \* \*